United States Patent Office 3,663,515
Patented May 16, 1972

3,663,515
PROCESS OF PREPARATION OF POLYCAPRO-
LACTONE POLYESTERS AND POLYURETHANE
ELASTOMERS THEREFROM
Fritz Hostettler, Verona, and Frank G. Lombardi, Clifton, N.J., assignors to Inter-Polymer Corporation, Passaic, N.J.
No Drawing. Continuation of application Ser. No. 715,165, Mar. 22, 1968. This application Apr. 13, 1970, Ser. No. 28,173
Int. Cl. C08g 22/10, 17/02
U.S. Cl. 260—77.5 AN                    11 Claims

ABSTRACT OF THE DISCLOSURE

There is disclosed a process for the polymerization of linear, predominantly hydroxyl-terminated monomeric components or low molecular weight polymers comprising the reaction products of (a) low-boiling alkylene glycols with 6-hydroxy-caproic acids or alkyl ester derivatives thereof, or optionally (b) low-boiling alkylene glycols with ε-caprolactones to higher molecular weight polyesters comprising subjecting said reaction products to temperatures of from about 150° C. to about 300° C. in the presence of an ester interchange catalyst while continuously removing the low-boiling alkylene glycols from the reacting mixture.

There is further disclosed a process for the depolymerization of predominantly hydroxy-terminated polyesters comprising polymeric reaction products of (a) glycols, amino alcohols or polyamines with 6-hydroxycaproic acids, or alkyl ester derivatives thereof, or optionally comprising (b) polymeric reaction products of glycols, amino alcohols or polyamines with ε - caprolactones, to lower molecular weight hydroxyl-terminated polyesters, comprising subjecting said polymeric reaction products to reaction with glycols at temperatures of from 150 to 300° C. in the presence of an ester interchange catalyst. The resulting polyesters are suitable for the production of polyurethane elastomers.

This application is a continuation of application Ser. No. 715,165, filed Mar. 22, 1968, now abandoned.

BACKGROUND OF THE INVENTION

Field of the invention

This invention relates to the polymerization and depolymerization of hydroxyl-terminated polyols derived from 6-hydroxycaproic acids or from epsilon-caprolactones to higher or lower molecular weight hydroxyl-terminated polymers which are eminently suitable for reaction with polyisocyanates to form urethane elastomers.

Description of the prior art

It is well known that polyesters can be reacted with polyisocyanates to produce polyurethane elastomers which are useful in an ever-increasing number of areas. For example polyurethane products have come to be useful as mechanical components in a variety of industries including the automotive industry. Accordingly, there remains a need in the art for low cost efficient procedures by which these materials may be produced.

Heretofore, polyester starting materials of this type have been prepared by various reactions employing starting materials such as adipic acid, in combination with initiators such as polyols or other compounds having at least one reactive hydrogen. However, polyesters formed from dicarboxylic acids are more suitable for producing polyurethanes having carboxylic acid end groups and the polyurethanes resulting therefrom are not useful over wide areas.

It has also been proposed to employ ring lactones such as epsilon-caprolactone, as the basic starting material. For example, U.S. Pat. No. 3,169,945 describes among other matters, the reaction of epsilon-caprolactones with initiators such as polyamines, amino alcohols, and polyols by heating the lactone in molar excess, with relation to said organic functional initiator, to produce a product having at least two reacted caprolactone units per reactive hydrogen substituent of the initiator. Obviously, it is also possible to conduct this type of reaction at other molar ratios, for example, at a ratio of 1 mol or less of epsilon-caprolactone per reactive hydrogen equivalent of the organic functional initiator to produce a reaction product possessing a very low molecular weight. For example, the reaction of one mol of epsilon-caprolactone with one mol of ethylene glycol would result in very substantial quantities of 2-hydroxyethyl 6-hydroxy-caproate along with small amounts, if any, of the lower oligomers.

Low molecular weight diols or polymeric polyesters of a type similar to those described with caprolactones may also be obtained by reacting polyols, amino alcohols or polyamines with 6-hydroxycaproic acids and their oligomers or with alkyl 6-hydroxycaproates.

Regardless of the particular method according to which the foregoing low molecular weight or higher molecular weight reaction products are made however, it is highly desirable from a practical point of view, to develop processes for conversion of these monomeric or polymeric esters to new and useful products of different molecular weight and composition by relatively simple and inexpensive commercial operations and thereby provide procedures for the production of polyester intermediates of this type, and the resulting polyurethane derivatives, which have molecular weights and structures different from those known heretofore.

SUMMARY OF THE INVENTION

It is accordingly one object of the present invention to provide a procedure for altering the molecular weights of such polymeric materials.

A further object of the invention is to provide a procedure for the conversion of monomeric or low molecular weight products to higher molecular weight intermediate products and to provide polyurethane products therefrom.

Other objects and advantages of the present invention will become apparent as the description thereof proceeds.

In satisfaction of the foregoing objects and advantages there is provided by the process of this invention a procedure for the preparation of polyurethane elastomers having excellent properties, which process comprises reacting an intermediate comprising a member selected from the group consisting of a (a) increased molecular weight polyesters and (b) decreased molecular weight hydroxyl-terminated polyesters, with a polyisocyanate, said increased molecular weight polyesters (a) being prepared by heating a lower molecular weight polymeric reaction product resulting from (1) the reaction of a low-boiling alkylene glycol with a 6-hydroxycaproic acid or alkyl ester thereof, or
(2) the reaction of a low-boiling alkylene glycol with an episilon-caprolactone.

at a temperature of about 150° C. to about 300° C. in the presence of an ester interchange catalyst while continuously removing the low-boiling alkylene glycols from the reaction mixture; and said decreased molecular weight hydroxyl-terminated polyesters (b) being prepared by heating a higher molecular weight polymeric reaction product resulting from (1) the reaction of glycols, amino alcohols or polyamines with a 6-hydroxycaproic acid or alkyl ester derivative thereof, or (2) the reaction of glycols, amino alcohols or polyamines with an epsilon-caprolactone, at a temperature of about 150° C. to about 300° C. in the presence of an ester interchange catalyst.

Also provided are the polymeric final products and intermediate products resulting from the above-identified processes.

DESCRIPTION OF THE PREFERRED EMBODIMENTS

In accordance with the present invention, it has been found that the above described procedures result in the production of polyurethane products having molecular weights and compositions different from those produced in prior art procedures. As indicated, the essence of the invention resides in the discovery that subjection of the indicated reaction products to the action of ester interchange catalysts under conditions of heat, results in the production of intermediates eminently suited for the ultimate preparation of polyurethanes by reaction with polyisocyanates as described hereinafter.

Thus, according to this invention, it has been discovered that polyester intermediates, useful for the production of polyurethanes, may be produced by the action of heat and an esterification catalyst on reaction products of alkylene glycols and a 6-hydroxycaproic acid or a caprolactone in one aspect and on reaction products of glycols, amino alcohols or polyamines and a 6-hydroxycaproic acid or a caprolactone in a second aspect. In the first case, the low-boiling glycols are continuously removed during the reaction to increase the molecular weight of the polymeric reaction products and in the second case, the polymeric reaction products are contacted with a glycol during the reaction to yield hydroxyl-terminated polyesters having lowered molecular weights. Both the high and low molecular weight products may then be employed to produce the final product polyurethane derivatives as described hereinafter.

In the first embodiment, wherein high molecular weight polyesters are employed, it has surprisingly been discovered that polyesters derived from 6-hydroxycaproic acids which are predominantly hydroxyl-terminated, when subjected to heating in vacuo in the presence of ester interchange catalysts at temperatures of from 150° C. or somewhat lower to temperatures up to 300° C. or somewhat higher, yield distillates which consist predominantly of glycols containing only relatively small quantities of epsilon-caprolactones. Moreover, it has been found that the residual polyester increases in molecular weight, still contains predominantly hydroxyl-terminated end-groups, and is eminently suitable for reaction with polyisocyanates for the production of urethane elastomers.

This was a surprising development and contrary to what had been accepted in the art in this area. For example, Belgian Pat. 693,971 describes a method for the depolymerization of polyesters from 6-hydroxycaproic acid by subjecting said polyesters to temperatures of from 150° to 350° C., preferably from 180 to 300° C., in the presence of a variety of catalysts which can generally be described as ester interchange catalysts. The reactions are performed under reduced pressure. According to the Belgian patent however, the resulting reaction products, i.e., the distillate, consists predominantly of epsilon-caprolactone. The polyesters described in the above patent contain terminal carboxyl and hydroxyl groups. In other words, the process described in the Belgian patent consists of a depolymerization reaction with a corresponding decrease of the molecular weight of the polymer as epsilon-caprolactone is removed via distillation. Therefore the present discovery that an increase in the molecular weight of the polyester can be accomplished is entirely unexpected.

Thus, according to this invention, essentially identical reaction conditions can be utilized to convert the monomeric ester intermediates, comprising reaction products of glycols and 6-hydroxycaproic acids or epsilon-caprolactones, or low molecular weight oligomers from such reactions, to higher molecular weight hydroxy-terminated polyesters which products are likewise eminently suitable for conversion to urethane elastomers and the like. The polymerization reaction is conducted at temperatures of from about 150° C. to about 300° C. in the presence of an ester interchange catalyst with relatively low-boiling glycols containing small amounts of epsilon-caprolactones being removed by applying a vacuum of 200 mm. Hg or less or by removing the glycols by means of a stream of inert gas such as, for example, nitrogen. It is essential for the reaction to go to completion that the glycols be removed in this manner. It is believed that results differet from that of the Belgian patent are obtained, i.e. increasing the molecular weight rather than destroying the polymer, because the present invention uses an hydroxyl terminated polymer or monomer as the starting material.

The reaction temperature for converting the monomeric or polymeric hydroxyl-terminated esters to polyesters of higher molecular weights may vary from 150° C. or somewhat lower to as high as about 300° C. or somewhat higher. The preferred temperature range is from 180 to 250° C.

Removal of the resulting glycols and small amounts of epsilon-caprolactones during the reaction is best accomplished by means of subjecting the reactant mixture to a vacuum of 300 mm. Hg to as low as 1 mm. Hg, although somewhat higher and lower pressures are entirely feasible. A preferred range is from 150 to about 20 mm. Hg. Alternatively, it is also feasible to remove the glycols by means of a purge with nitrogen or other inert gases. Obviously, equivalent methods may also be employed.

The operation of the above process requires the presence of one or more catalsts known to accelerate the interchange of esters with hydroxyl compounds. Among the many catalysts which are capable of promoting ester interchange reactions are the alkoxides and acylates of titanium, zirconium, aluminum, zinc, cadmium, magnesium, tin, lead and antimony. Other useful compounds are organic tin compounds such as the dialkyltin derivatives, zinc and lead borate, antimony trioxide, litharge, and the like. Catalyst concentrations as low as 5 parts per million and lower based on the reactant for the most active catalysts to as high as 0.5% based upon the reactants utilized for the less active catalysts may be utilized. In the event that the resulting polyester product is to be utilized in the manufacture of polyurethanes it is highly desirable to utilize very low catalyst concentrations since the metallic residues exert oftentimes a catalytic effect upon the isocyanatehydroxyl reaction.

The molecular weight of the hydroxyl-terminated monomeric or polymeric ester to be subjected to the polymerization reaction is not particularly critical except for the fact that polymeric esters of already relatively high molecular weight, for example, 2500 and above are more difficult to polymerize than the lower molecular weight products. It is believed practical to effect polymerization to molecular weights of 4000 and above by the processes described in the present invention.

It is also within the scope of the present invention to utilize mixtures of branched and linear lower molecular weight polymeric or monomeric esters of 6-hydroxycaproic acids which when polymerized yield the corresponding higher molecular weight products thereof. Many polyfunctional polyols suitable for the preparation of branched products are for example described in U.S. Pat. 3,169,945, in case such products are to be prepared from ε-caprolactones.

While many different glycol reaction products of 6-hydroxycaproic acids or epsilon-caprolactones may be utilized, the reaction products of the lower boiling glycols such as, for example, ethylene glycol, diethylene glycol, 1,3-propanediol, 1,4-butanediol, 1,6-hexanediol, and the like are preferred since they may be distilled over-head during the polymerization reaction under milder conditions.

The 6-hydroxycaproic acids which are particularly suitable for reaction with the glycols to form the monomeric or polymeric hydroxyl-terminated materials comprise 6-hydroxycaproic acid and lower alkyl-substituted 6-hydroxycaproic acids, such as the methyl- and dimethyl-substituted 6-hydroxycaproic acids. The alkyl ester derivatives of these acids, e.g. methyl, ethyl, propyl, etc. may also be employed.

The epsilon-caprolactones which are particularly suitable for the preparation of the monomeric or polymeric hydroxyl-terminated materials to be subjected to the subsequent polymerization reactions hereinabove described are epsilon-caprolactone and the lower alkyl-substituted epsilon-caprolactones such as the methyl- and dimethyl-substituted derivatives. The monomeric or polymeric hydroxyl-terminated materials to be subjected to the subsequent polymerization reactions hereinabove described may also be prepared by reacting the aforementioned glycols with alkyl 6-hydroxycaproates, such as, for example, methyl 6-hydroxycaproates, in the presence of ester interchange catalysts.

The reaction of the 6-hydroxycaproic acid or derivative thereof or the epsilon-caprolactone with the alkylene glycol to form the polyesters of the present invention may be carried out by contacting the respective reactants at a temperature of about 120° to 250° C. for best results. In a preferred embodiment, the glycol and lactone are employed in substantially equimolar amounts. Moreover, the reaction is preferably conducted under an atmosphere of an inert gas such as nitrogen.

The molecular weights of the polymers resulting from reaction of the glycol and 6-hydroxycaproic acid or epsilon-caprolactone may be conveniently determined from the average number of carboxyl and hydroxyl groups in a given amount of the polyester. The acid number (milligrams of KOH per gram of polyester using phenolphthalein as an indicator (is a measure of the number of terminal carboxyl groups in a polyester. The hydroxyl number, which is a measure of the number of terminal hydroxyl groups, and is defined in terms of milligrams of KOH per gram of polyester, is determined by adding pyridine and acetic anhydride to the polyester and titrating the acetic acid formed with KOH as described in Ind. Eng. Chem., Anal. Ed., vol 16, pages 541–9, and in Ind. Eng. Chem., Anal. Ed., vol 17, page 394. The sum of the acid or carboxyl number and the hydroxyl number, referred to as the reactive number, is an indication of the average number of terminal groups present in the polyester and therefore is in turn as indication of the number of molecules in the mass and the degree of polymerization. A polyester containing long chain molecules will have a relatively low reactive number while a polyester containing short chain molecules will prossess a relatively high reactive number.

In a second embodiment of the present invention there is employed a depolymerized or lowered molecular weight polyester product for use in the reaction. In the above described process, it was demonstrated that the molecular weight of the hydroxyl-terminated polymers of 6-hydroxycaproic acids could be increased by subjecting said polymers to elevated temperatures in the presence of an ester interchange catalyst while removing glycols therefrom by convenient means.

Surprisingly, it has now been found that the reverse process is also feasible. This reverse process comprises the addition of glycols to hydroxyl-terminated polymers of a 6-hydroxycaproic acid or epsilon-caprolactone, and thereafter subjecting the mixture to elevated temperatures in the presence of an ester interchange catalyst to effect redistribution of the polyester to yield a product of lower molecular weight.

Thus this embodiment comprises reacting an alkylene glycol with a polyester or hydroxyl-terminated polymer of a 6-hydroxycaproic acid, alkyl ester or alkyl substituted derivative or epsilon-caprolactone with polyols, amino alcohols or polyamines. There may also be employed additional reactants such as glycols and dicarboxylic acids. The polyesters or hydroxyl terminated polymers and their method of preparation are fully described in U.S. Pat. No. 3,169,945.

This finding is of important commercial significance since it demonstrates a successful method for the conversion of a polyester, derived from ε-caprolactones or optionally from 6-hydroxycaproic acids or derivatives thereof, to a product of lower molecular weight by simply heating said polyester with the calculated amount of a glycol in the presence of an ester interchange catalyst. In addition to the particular equilibration reaction demonstrated above, said equilibration can also be conducted with varying amounts of glycols other than ethylene glycol to arrive at the desired result. Among other glycols which can be utilized for this purpose are diethylene glycol, propylene glycol, dipropylene glycol, 1,3-propanediol, 1,4-butanediol, 1,6 - hexanediol, p,p'-xylylenediol, bis-(2-hydroxyethyl) hydroquinone, quinitol, neopentylene glycol, etc.

The redistribution reaction or depolymerization procedure is performed at temperatures ranging from about 150° C. or lower to 300° C., and preferably from about 160° C. to 220° C.

The catalysts useful for performing the equilibration reaction are the ester interchange catalysts of the type mentioned hereinabove with respect to the polymerization reaction. The catalyst concentration may vary from 5 parts per million or lower based upon the weights of reactant to 0.3% or higher by weight based upon the amounts of the reactants. If the resulting product is to be utilized for the formation of urethane elastomers, low catalyst concentration is preferable.

The number of equivalents of glycol charged for the equilibration of one equivalent of polyester polyol will determine the reduction of the molecular weight which is to be effected. The type of glycol utilized for the equilibration reaction is not critical and aliphatic, cycloaliphatic, heterocyclic, as well as glycols containing aromatic nuclei, may be utilized. In general, simple low-boiling aliphatic glycols such as ethylene and di-ethylene glycol, 1,4-butanediol, 1,6-hexanediol and the like are preferred.

The reaction time depends upon the several variables present such as reaction temperature, type of catalyst, catalyst concentration, and the like. The progress of the reaction and attainment of the new equilibrium distribution can readily be ascertained by following the change of the refractive index or of the viscosity of the redistributing reaction mixture. Completion of the reaction is indicated by attainment of a constant refractive index or a constant viscosity.

The aforementioned process is eminently suitable for the adjustment of the desired molecular weight of such polyesters in production operations. The equilibrated polyesters are exceedingly suitable in the production of polyurethanes where a high degree of reproducibility is required.

After the altered molecular weight polymer intermediates are produced by the methods described above, they are admirably suited for reaction with polyisocyanates to produce polyurethanes by known methods.

In regard to the use of these polymeric materials in this reaction, one advantage of the present invention is that the polyesters resulting from the reaction can be employed without separation from oligomers formed, thus obviating a purification step necessary in prior art processes.

In general these procedures comprise reaction of the polyesters with a polyisocyanate, and also if desired, with one or more compounds containing active hydrogen.

These reactions may generally be carried out in essentially the manner already described in the prior art. The so-called "one-shot" technique, in which the polyester is reacted simultaneously with a polyisocyanate and a polyol, or the "prepolymer" technique, in which it is first reacted with a diisocyanate to lengthen the polyester chain and provide terminal isocyanate groups thereon, and the prepolymer thus prepared is then reacted with a polyol or other active hydrogen-containing compound, may be employed.

The identity of polyisocyanates and active hydrogen-containing compounds, particularly diols, as well as the reaction conditions are well known in the art. Thus, for instance, the isocyanates may be diphenylmethane-, phenylene-, toluene-, xylylene- or dibenzylene-diisocyanates and the active hydrogen-containing compounds may be diols such as butanediol or other glycols, as well as amino alcohols and tri- or tetrafunctional compounds such as triols, tetrols, and the like. Reaction temperatures may vary between about 20 and 300° C., temperatures between about 70 and 160° C. being preferred.

As in the prior art reactions, there is oftentimes included in this reaction the necessary catalysts such as organic and inorganic derivatives of metals such as tin, lead, zinc and the like as well as organic amines such as triethyl amine, methyl amine and the like. In addition, if a foam product is desired, blowing agents, such as fluorocarbons, water, emulsifiers, and other known additives may be included in small amounts in known procedures to effectively carry out this reaction.

The following examples will serve to further illustrate the advantages of the invention but are not to be considered as limitative thereon.

In the following examples, parts of each component are by weight unless otherwise indicated. Analytical procedures for the determination of acid and hydroxyl numbers were performed according to accepted ASTM methods.

EXAMPLE I (A) 524 grams of epsilon-caprolactone and 152 grams of 1,3-propanediol in a molar ratio of 2.3 to 1 respectively are heated at 185° C. under a stream of dry nitrogen for 16 hours in the presence of 10 parts per million of stannous octoate catalyst. The resulting polyester had a hydroxyl number of 331.6 and an acid number of 0.26. The molecular weight, determined from hydroxyl number and acid number was 352.7.

(B) 550 grams of the polyester of Example I-A was heated to 235° C.–240° C. at a vacuum of from 175 to 144 mm. Hg in the presence of 20 parts per million stannous octoate for eight hours. 71 grams of distillate was recovered containing approximately 82% by weight 1,3-propanediol and 18% by weight $\epsilon$-caprolactone determined by vapor phase chromatographic analysis. After an additional 3.5 hours at approximately 239° C. and 130 mm. Hg vacuum a total of 102 grams of distillate was obtained. The resulting polymer was a wax-like solid at 25° C. having a hydroxyl number of 111.3, an acid number of 1.12 and a molecular weight of 998.1.

EXAMPLE II 1938 grams of epsilon-caprolactone (17 moles) and 1055 grams (17 moles) of ethylene glycol are heated to 185° C. in the presence of 10 parts per million tetraisopropyltitanate for 1.5 hours to effect conversion of the lactone to a linear diol.

Thereafter, the reactants are heated at 185° to 230° C. over a period of 10 hours while a vacuum of 165 to 60 mm. Hg is applied. During this period 1045 grams of distillate are removed overhead, while the remaining residue materials are converted to hydroxy-terminated polymer via ester interchange reaction. Vapor phase chromatographic analysis of the distillate indicated the latter to consist of a mixture of 97.5% by weight of ethylene glycol and 2.5% by weight of $\epsilon$-caprolactone. The residue polyester product was a waxy solid having a hydroxyl number of 75.8, an acid number of 0.93, and a molecular weight of about 1480.

The above polyester product was further subjected to stripping at a temperature of 240° C. under a vacuum of 55 to 40 mm. Hg for a period of 2.6 hours during which time 90 grams of distillate was recovered. The resulting residue product was a wax-like solid at room temperature. Upon analysis it exhibited a hydroxyl number of 43.9 and an acid number of 0.94, corresponding to a molecular weight of about 2555. Analysis for terminal unsaturation by means of the well known mercuric acetate method, ASTM D–1638) showed a total unsaturation of only 0.0085 milliequivalents per gram indicating that the above, relatively severe, reaction conditions do not lead to dehydration or other cracking reactions which would lead to undesirable terminal unsaturation.

EXAMPLE III 1000 grams of the polymer of Example 2, having a hydroxyl number of 43.9, an acid number of 0.94 and a molecular weight of 2555, was admixed with 7.05 grams of the original distillate of Example 2, which consisted of 97.5% by weight of ethylene glycol and 2.5% by weight of epsilon-caprolactone. The mixture, which contained the titanate ester interchange catalyst was subjected to a temperature of 185° C. for a period of 4 hours. The resulting polyester had a hydroxyl number of 53.6 and an acid number of 0.94, corresponding to a molecular weight of about 2090. Examination of the viscosity of the original polyester product having a molecular weight of 2555 by means of a Brookfield viscometer at a temperature of 60° C. showed a viscosity of 1110 centipoises. Examination of the viscosity of the equilibrated polyester having a molecular weight of 2090 showed a viscosity of 950 centipoises at 60° C. The large difference in the viscosities of the initial polyester and the second polyester shows clearly that ester interchange reaction between the initial polyester and the newly added glycol did result in new equilibrium conditions with the resulting formation of a new polyester product.

EXAMPLE IV 934.8 grams of epsilon-caprolactone (8.2 moles) and 508.9 grams of ethylene glycol (8.2 moles) were heated with 5 parts per million tetraisopropyltitanate with nitrogen sparge for four hours at 185° C. The product was then subjected to stripping at a temperature from 170° C. to 235° C. under a vacuum of from 155 to 145 mm. Hg vacuum for 2.5 hours. The distilalte of 447 grams upon analysis was shown to contain 4.0 percent by weight $\epsilon$-caprolactone and 96.0 percent by weight of ethylene glycol. Analysis of the polymer gave an acid number of 0.68, a hydroxyl number of 163.8, corresponding to a molecular weight of about 685.

Further stripping for one hour at 235° C. at no less than 100 mm. Hg vacuum resulted in the removal of 30 grams of additional distillate.

The resulting polymer was a wax-like solid having a hydroxyl number of 119.2, an acid number of 0.76 and a molecular weight of 941.0.

EXAMPLE V 350 grams of the polyol described in Example 2, and having a hydroxyl number of 43.9 and an acid number of 0.94, was reacted with 59.9 grams of an 80:20 mixture of 2,4- and 2,6-tolylene diisocyanate at a temperature of 80° C. for a period of 3 hours under an atmosphere of dry nitrogen. The resulting solid isocyanate-terminated reaction product had an NCO content of 4.01% by weight.

EXAMPLE VI 140 grams of the isocyanate-terminated product of Example 5 was heated to 80° C. and intimately mixed with 16.1 grams of 4,4'-methylene bis (o-chloroaniline) which had been preheated to 121° C., for a period of 2 minutes. During this time, the reactants were subjected to a vacuum of 2 mm. Hg to effect degassing of the mixture before casting. During this reaction, the temperature of the ingredients rose from 88° C. to 98° C. The reacting mixture was immediately cast into a metal mold which has been preheated to 100° C. The mold was then closed and held at a temperature of 120° C. for a period of 45 minutes, whereupon the elastomer was removed from the mold and cured for an additional 1.25 hours in a hot air circulating oven at 100° C.

The physical properties of the elastomers were determined after an additional post-cure of one week at ambient conditions.

TABLE I

| Property | Result | ASTM method |
|---|---|---|
| Shore Hardness, A | 85 | D 1484-59 |
| Modulus at: | | |
| 100% elongation, p.s.i | 702 | D 412-61T |
| 200% elongation, p.s.i | 973 | D 412-61T |
| 300% elongation, p.s.i | 1,513 | D 412-61T |
| 400% elongation, p.s.i | 3,459 | D 412-61T |
| 500% elongation, p.s.i | 6,324 | D 412-61T |
| Tear strength, p.s.i | 602 | D 624-54, Die C |
| Ultimate strength, p.s.i | 6,105 | D 412-61T |
| Ultimate elongation, percent | 500 | D 412-61T |
| Thickness, in | 0.076 | |

EXAMPLE VII 300 grams of the polyol described in Example 4, having a hydroxyl number of 119.2 and a carboxyl number of 0.76, was reacted with 90.2 grams of an 80:20 mixture of 2,4- and 2,6-tolylene diisocyanate at 80° C. for a period of 3 hours under an atmosphere of dry nitrogen. Upon analysis, the resulting isocyanate-terminated polymer was found to contain 4.06% NCO by weight.

EXAMPLE VIII

An elastomer was prepared according to the procedure described in Example 6 by reacting 110 grams of the isocyanate-terminated prepolymer of Example 7 with 12.8 grams of 4,4'-methylene bis (o-chloroaniline). After paper cure of the elastomer and standing thereof at ambient conditions for a period of one week the following properties were observed.

| Property | Result | ASTM method |
|---|---|---|
| Shore Hardness, A | 85 | D 1484-59 |
| Modulus at: | | |
| 100% elongation, p.s.i | 702 | D 412-61T |
| 200% elongation, p.s.i | 973 | D 412-61T |
| 300% elongation, p.s.i | 1,513 | D 412-61T |
| 400% elongation, p.s.i | 3,459 | D 412-61T |
| 500% elongation, p.s.i | 6,324 | D 412-61T |
| Ultimate strength, p.s.i | 6,324 | D 412-61T |
| Ultimate elongation, percent | 500 | D 412-61T |
| Tear strength, p.s.i | 440 | D 624-54, Die C |
| Thickness, in | 0.074 | |

From the polyesters described in the foregoing examples, other polyurethane elastomers may be prepared by reacting said polyesters with other isocyanates such as, for example, p,p'-diphenylmethane diisocyanate, 3,3'-dimethyl-4,4'-biphenylene diisocyanate, 1,5-naphthalene diisocyanate, hexamethylene diisocyanate, or mixtures thereof, to produce isocyanate-terminated products which may then be extended with glycols, such as 1,4-butanediol, 1,6-hexanediol, bis (2-hydroxyethyl) hydroquinone, and quinitol, amino alcohols, or diamines to form cast elastomers or other urethanes which are suitable for use as injection-molding resins. Moreover, it is feasible to conduct the aforementioned urethane elastomer formation by means of the so-called "one-shot" technique, whereby the polyester, the extender and the polyisocyanate are reacted simultaneously. All these methods are well-known in the art.

It is apparent that various obvious modifications of the present invention will become apparent to those skilled in the art upon reading this description. Therefore all such obvious modifications are intended to be included within the scope of the invention as defined by the appended claims.

What is claimed is:

1. A process which comprises heating (1) reaction products which are characterized by possessing one or more oxycaproyl units and which have a molecular weight ranging from that of 2-hydroxyethyl 6-hydroxycaproate to 2500, said reaction products resulting via the reaction of:

(i) A low-boiling alkylene glycol with a 6-hydroxycaproic acid; or (ii) a low-boiling alkylene glycol with the alkyl ester of a 6-hydroxycaproic acid; or (iii) a low-boiling alkylene glycol with an epsilon-caprolactone;

(2) to a temperature of from about 150° C. to about 300° C.; (3) in the presence of an ester interchange catalyst; (4) while continuously removing said low boiling alkylene glycol from the reaction mixture; (5) for a period of time sufficient to produce hydroxyl-terminated final products which possess a maximum molecular weight of 4000 and which also contain a greater number of oxycaproyl units per molecule than said initial reaction products.

2. A process which comprises heating (1) hydroxyl-terminated polymers which are characterized by possessing oxycaproyl units and which have a maximum molecular weight of 4000, said hydroxyl-terminated polymers resulting from the reaction of:

(i) glycols, amino alcohols, or polyamines with a 6-hydroxycaproic acid; or (ii) glycols, amino alcohols, or polyamines with a alkyl ester of a 6-hydroxycaproic acid;

(2) with an added quantity of a glycol; (3) in the presence of an ester interchange catalyst; (4) at a temperature of from 150° C. to 300° C.; (5) for a period of time sufficient to produce equilibrated hydroxyl-terminated products which have a lower molecular weight and a lesser number of oxycaproyl units per molecule than said initial hyroxyl-terminated polymers.

3. The process according to claim 1 wherein said low boiling alkylene glycol is ethylene glycol, diethylene glycol, dipropylene glycol, 1,3-propanediol, 1,4-butanediol, 1,5-pentanediol, or 1,6-hexanediol.

4. The process of claim 1 wherein said low boiling alkylene glycol is ethylene glycol.

5. The process according to claim 1 wherein the hydroxyl-terminated final products are further reacted with a polyisocyanate to form a polyurethane elastomer.

6. The process according to claim 5 in which a chain extender of the group consisting of glycols, bis(2-hydroxyethyl) ether of hydroquinone, amino alcohols, and diamines is added to prepare the same.

7. The process of claim 5 wherein said polyisocyanate is p,p'-diphenylmethane diisocyanate, 1,5-naphthalene diisocyanate, or toluene diisocyanate.

8. The process of claim 2 wherein said glycol is ethylene glycol.

9. The process according to claim 2 wherein the hydroxyl-terminated final products are further reacted with a polyisocyanate to form a polyurethane elastomer.

10. The process according to claim 9 in which a chain extender of the group consisting of glycols, bis(2-hydroxyethyl) ether of hydroquinone, amino alcohols, and diamines is added to prepare the same.

11. The process according to claim 9 in which said polyisocyanate is p,p'-diphenylmethane diisocyanate, 1,5-naphthalene diisocyanate, or toluene diisocyanate.

References Cited

UNITED STATES PATENTS

| | | | |
|---|---|---|---|
| 2,691,006 | 10/1954 | Flory | 260—45.4 |
| 2,933,477 | 4/1960 | Hostettler. | |
| 3,000,849 | 9/1961 | Clachan et al. | 260—45.4 |
| 3,305,495 | 2/1967 | Vom Orde | 260—2.3 |

OTHER REFERENCES

Flory, Principles of Polymer Chemistry, Cornell Univ. Press Ithaca, N.Y. (1953), pp. 86–94, 320–326.

Fettles, Chemical Reactions of Polymers (vol. XIX of "High Polymers"), Interscience, New York (1964), pp. 501–514.

DONALD E. CZAJA, Primary Examiner

H. S. COCKERAM, Assistant Examiner

U.S. Cl. X.R.

260—78.3 R